US008483721B2

(12) United States Patent
Tang

(10) Patent No.: US 8,483,721 B2
(45) Date of Patent: Jul. 9, 2013

(54) BASE STATION APPARATUS AND COMMUNICATION METHOD

(75) Inventor: Pei-Chong Tang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 71 days.

(21) Appl. No.: 13/328,076

(22) Filed: Dec. 16, 2011

(65) Prior Publication Data

US 2012/0295653 A1 Nov. 22, 2012

(51) Int. Cl.
*H04W 24/00* (2009.01)

(52) U.S. Cl.
USPC ..... 455/456.5; 455/410; 455/411; 455/414.1; 455/414.2; 455/456.1; 455/456.2; 455/456.3; 455/41.1; 455/41.2; 455/67.11; 455/67.14; 340/539.1; 340/539.13; 340/572.1; 340/8.1; 340/10.1

(58) Field of Classification Search
USPC ..... 455/404.1–404.2, 410, 411, 456.1–456.6, 455/457, 41.1–41.3, 67.11, 67.14, 414.1–414.2, 455/421; 340/539.1, 539.11–539.19, 539.2–539.26, 568.1, 568.5, 568.6, 572.1, 340/8.1, 10.1
See application file for complete search history.

(56) References Cited

U.S. PATENT DOCUMENTS

| | | | | |
|---|---|---|---|---|
| 5,886,634 A * | 3/1999 | Muhme | | 340/572.1 |
| 6,496,806 B1 * | 12/2002 | Horwitz et al. | | 705/28 |
| 6,977,612 B1 * | 12/2005 | Bennett | | 342/357.46 |
| 7,030,760 B1 * | 4/2006 | Brown | | 340/568.1 |
| 7,174,172 B2 * | 2/2007 | Sharony et al. | | 455/456.1 |
| 7,177,738 B2 * | 2/2007 | Diaz | | 701/29.3 |
| 7,532,895 B2 * | 5/2009 | Hrastar | | 455/456.1 |
| 7,589,616 B2 * | 9/2009 | Klatsmanyi et al. | | 340/10.1 |
| 7,656,273 B2 * | 2/2010 | Ehrman et al. | | 340/10.1 |
| 7,667,573 B2 * | 2/2010 | Ehrman et al. | | 340/10.1 |
| 7,840,227 B2 * | 11/2010 | Kahlert et al. | | 455/456.2 |
| 7,925,278 B2 * | 4/2011 | Bani Hani | | 455/456.6 |
| 7,932,824 B2 * | 4/2011 | Flores et al. | | 340/572.1 |
| 8,095,147 B2 * | 1/2012 | Ahlgren | | 455/456.1 |
| 8,175,578 B2 * | 5/2012 | McCown et al. | | 455/411 |
| 2003/0134648 A1 * | 7/2003 | Reed et al. | | 455/456 |
| 2005/0101332 A1 * | 5/2005 | Kotzin | | 455/456.1 |
| 2010/0040057 A1 | 2/2010 | Ko | | |
| 2010/0112980 A1 * | 5/2010 | Horn et al. | | 455/411 |
| 2011/0285506 A1 * | 11/2011 | Hillis | | 340/8.1 |

* cited by examiner

*Primary Examiner* — Tuan A Tran
(74) *Attorney, Agent, or Firm* — Altis Law Group, Inc.

(57) ABSTRACT

A base station apparatus includes a primary transceiver and a processing unit for controlling the primary transceiver to communicate with the related communication apparatuses during a full scan period. The full scan period includes at least one sub-scan period, during one sub-scan period, the processing unit performs a primary communication test between the primary transceiver and each of the related communication apparatuses, judges whether the primary communication test has failed, and determines the corresponding communication apparatus as a failed communication apparatus if the primary communication test has failed. The processing unit further performs a secondary communication test between the primary transceiver and each failed communication apparatus in the previous sub-scan period during a next sub-scan period.

19 Claims, 3 Drawing Sheets

BASE STATION APPARATUS AND COMMUNICATION METHOD

BACKGROUND

1. Technical Field

The disclosed embodiments relate to communication methods, and more particularly to a communication method and a base station apparatus.

2. Description of Related Art

In industrial manufacturing areas, a communication system is used for controlling a plurality of movable vehicles to transfer articles between a warehouse and a plurality of article buffer stations. The communication system includes a base station apparatus located adjacent to the warehouse, a primary transceiver mounted to the base station apparatus, and a secondary transceiver mounted to each of the movable vehicles.

In normal situations, the base station apparatus transmits a request signal to each of the movable vehicles via the primary transceiver, and receives a response signal from the secondary transceiver of each movable vehicle in response to the request signal, that is the base station apparatus has established a successful communication with each of the movable vehicles. However, in some situations, the base station apparatus cannot receive the response signal from some movable vehicles due to communication errors.

In order to solve the above problems, the base station apparatus needs to repeatedly transmit the request signal to all the movable vehicles, therefore the communication efficiency is reduced.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout three views.

DETAILED DESCRIPTION

Figure 1:
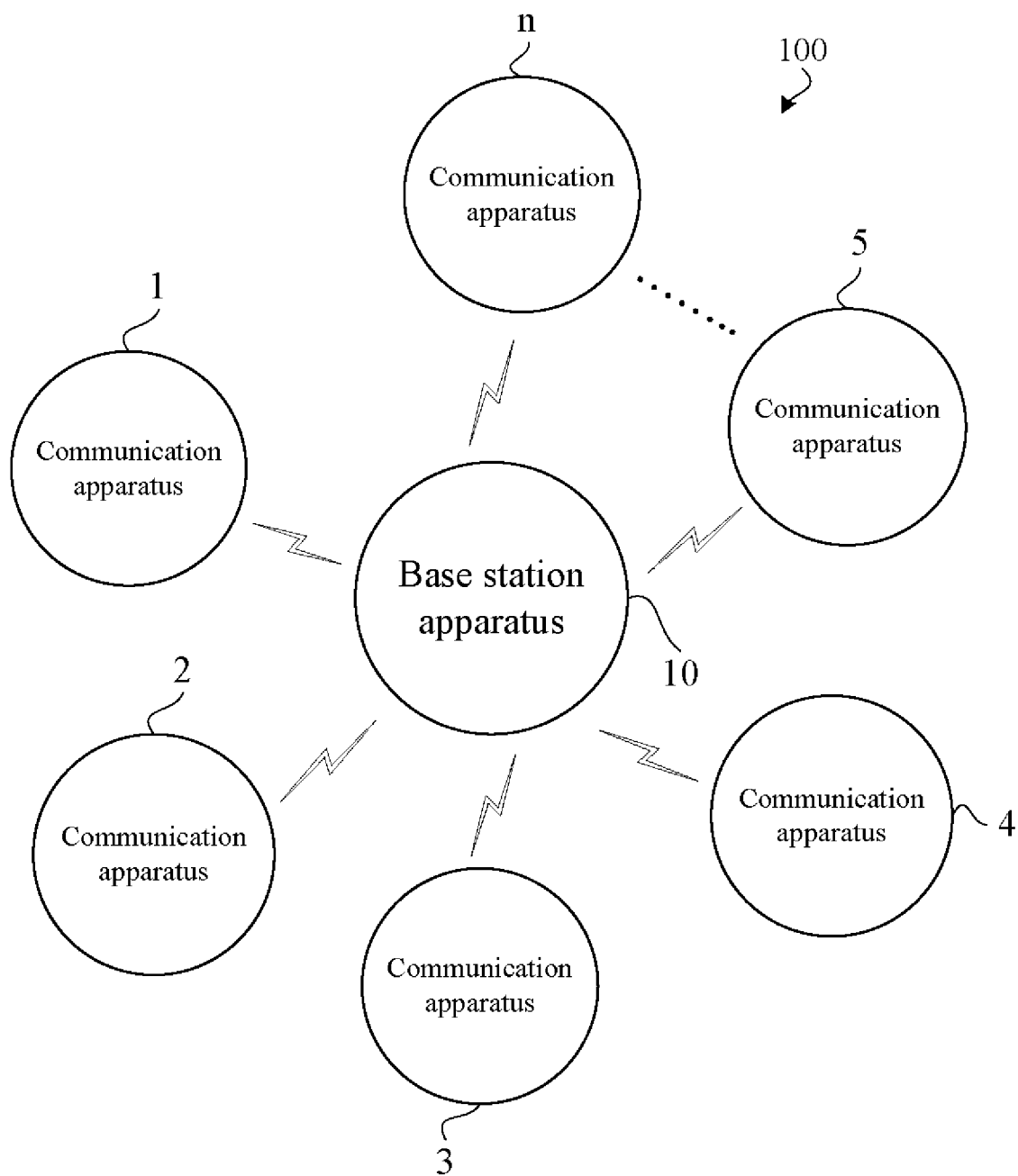
FIG. 1 is a schematic diagram showing a communication system in accordance with one embodiment, the communication system includes a base station apparatus and a plurality of communication apparatuses.
Figure 2:
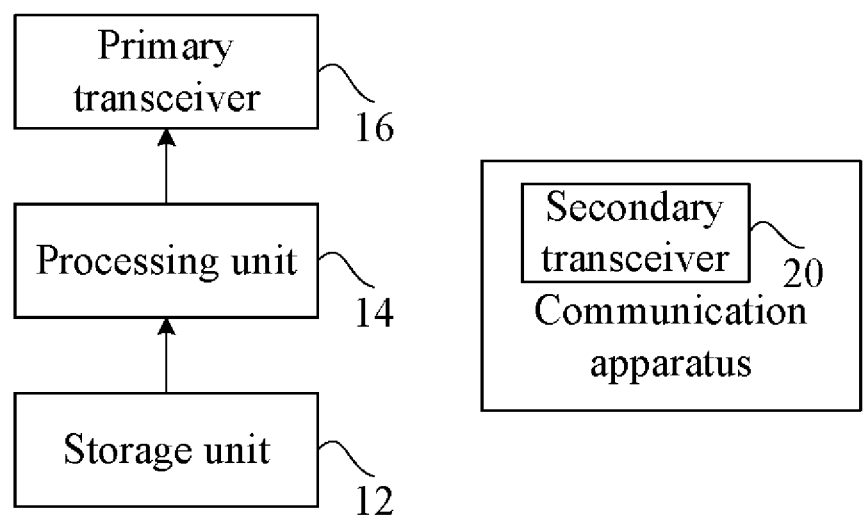
FIG. 2 is a block diagram of the base station apparatus and each communication apparatus in FIG. 1.

Referring to FIGS. 1 and 2, a communication system 100 includes a plurality of communication apparatuses 1, 2, . . . , n and a base station apparatus 10 for communicating with the plurality of communication apparatuses 1, 2, . . . , n. The base station apparatus 10 includes a storage unit 12, a processing unit 14, and a primary transceiver 16. Each of the communication apparatuses 1, 2, . . . , n includes a secondary transceiver 20. The base station apparatus 10 is placed adjacent to a warehouse (not shown), the communication apparatuses 1, 2, . . . , n are respectively mounted to a plurality of movable vehicles (not shown). The communication system 100 is used for controlling the plurality of movable vehicles to transfer articles between the warehouse and a plurality of article buffer stations, to maintain the normal supply of articles. In this embodiment, each of the plurality of communication apparatuses 1, 2, . . . , n is a wireless communication apparatus.

The processing unit 14 is used for controlling the primary transceiver 16 to communicate with the related communication apparatuses during a full scan period. The full scan period includes at least one sub-scan period, during one sub-scan period, the processing unit 14 performs a primary communication test between the primary transceiver 16 and each of the related communication apparatuses, judges whether the primary communication test has failed, and determines the corresponding communication apparatus as a failed communication apparatus if the primary communication test has failed. If the primary communication test is successful, the full scan period is completed.

The processing unit 14 further performs a secondary communication test between the primary transceiver 16 and each failed communication apparatus in the previous sub-scan period during a next sub-scan period, judges whether the secondary communication test has failed, and determines the corresponding communication apparatus as the failed communication apparatus if the secondary communication test has failed. If the secondary communication test has failed, the processing unit 14 repeatedly performs the secondary communication test. If the secondary communication test is successful, the full scan period is completed.

In this embodiment, during a first sub-scan period, the processing unit 14 performs the primary communication test between the primary transceiver 16 and each of the plurality of communication apparatuses 1, 2, . . . , n. In detail, the storage unit 12 stores a plurality of identification (ID) codes respectively assigned to the plurality of communication apparatuses 1, 2, . . . , n. The processing unit 14 is used for controlling the primary transceiver 16 to transmit a request signal to each of the communication apparatuses 1, 2, . . . , n and ready to receive a response signal from the secondary transceiver 20 of each of the communication apparatuses 1, 2, . . . , n in response to the request signal; each response signal includes the ID code of corresponding communication apparatus. The processing unit 14 judges whether each ID code included in each response signal matches with each ID code stored in the storage unit 12 to judge whether the primary transceiver 16 has successfully received the response signal from all the communication apparatuses 1, 2, . . . , n. If it is determined that the primary transceiver 16 has successfully received the response signal from all the communication apparatuses 1, 2, . . . , n, the full scan period is completed.

In this embodiment, the processing unit 14 controls the primary transceiver 16 to transmit the request signal every first predetermined time period. The processing unit 14 further judges whether the primary transceiver 16 has received the response signal during a second determined time period after the primary transceiver has transmitted the request signal. If it is determined that the primary transceiver 16 has not received the response signal during the second determined time period, the processing unit 14 controls the primary transceiver 16 to stop searching for the response signal.

Taking the communication apparatuses 1, 2, 3, 4, 5, 6 for example, during the first sub-scan period, the base station apparatus 10 transmits the request signal to each of the communication apparatuses 1, 2, 3, 4, 5, 6 via the primary transceiver 16, and receives the response signal from the secondary transceiver 20 of each of the communication apparatuses 1, 2, 3, 6. That is, the communication between the base station apparatus 10 and the communication apparatuses 4, 5 has failed.

During the second sub-scan period, the base station apparatus 10 transmits the request signal to each of the communication apparatuses 4, 5 via the primary transceiver 16, and receives the response signal from the secondary transceiver 20 of the communication apparatus 4. That is, the communication between the base station apparatus 10 and the communication apparatus 5 has failed.

During the third sub-scan period, the base station apparatus 10 transmits the request signal to the communication apparatus 5 via the primary transceiver 16, and receives the response signal from the secondary transceiver 20 of the communication apparatus 5. Because the communication between the base station apparatus 10 and all the communication apparatuses 1, 2, 3, 4, 5, 6 is successful, the full scan period is completed.

According to the above descriptions, during one sub-scan period, the processing unit 14 only perform the communication test between the primary transceiver 16 and all the failed communication apparatuses in the previous sub-scan period, but not repeatedly perform the communication test between the primary transceiver 16 and all the communication apparatuses, therefore the communication efficiency is enhanced.

Figure 3:
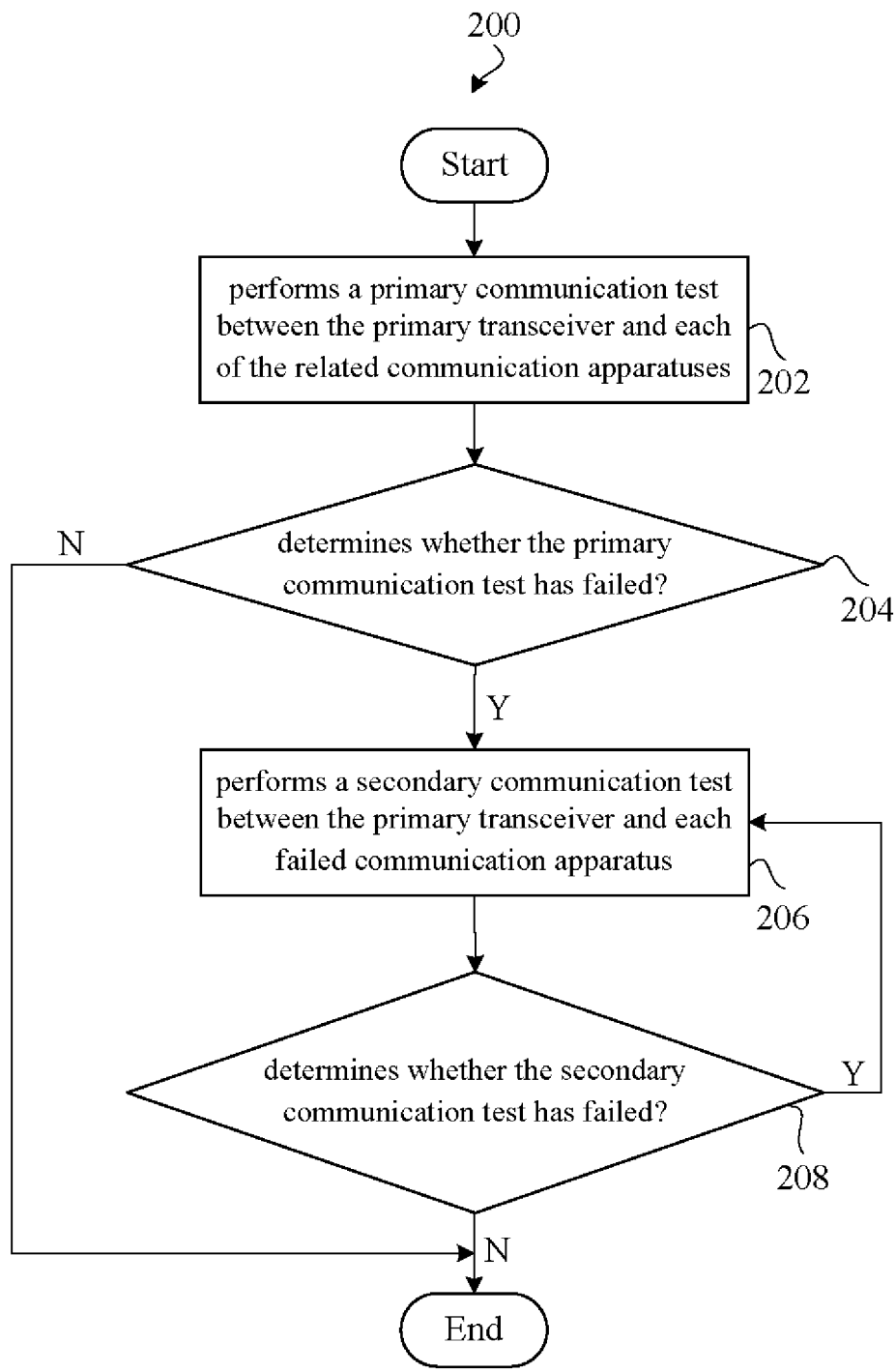
FIG. 3 is a flow chart showing a communication method in accordance with one embodiment.

Referring to FIG. 3, a communication method 200 is implemented in the communication system 100, the communication method 200 utilizes the processing unit 14 to control the primary transceiver 16 to communicate with the related communication apparatuses during a full scan period, the full scan period includes at least one sub-scan period. The communication method 200 includes the following steps.

Step 202, during one sub-scan period, the processing unit 14 performs a primary communication test between the primary transceiver 16 and each of the related communication apparatuses. In detail, the step of performing the primary communication test is described as follows: the storage unit 12 stores a plurality of identification (ID) codes respectively assigned to the related communication apparatuses. The processing unit 14 controls the primary transceiver 16 to transmit a request signal to each of the related communication apparatuses and ready to receive a response signal from each of the related communication apparatuses in response to the request signal; each response signal includes the ID code of corresponding communication apparatus. In this embodiment, during a first sub-scan period, the processing unit 14 performs the primary communication test between the primary transceiver 16 and each of the plurality of communication apparatuses 1, 2, . . . , n.

Step 204, the processing unit 14 judges whether the primary communication test has failed. If the primary communication test has failed, the processing unit 14 determines the corresponding communication apparatus as a failed communication apparatus, then the process goes to step 206. If the primary communication test is successful, then the process ends. In detail, the step of judging whether the primary communication test has failed is described as follows: the processing unit 14 judges whether each ID code included in each response signal matches with each ID code of the related communication apparatuses stored in the storage unit 12 to judge whether the primary transceiver 16 has successfully received the response signal from all the related communication apparatuses. If it is determined that the primary transceiver 16 has successfully received the response signal from all the related communication apparatuses, the primary communication test is successful, and the full scan period is completed; otherwise the primary communication test is failed.

Step 206, the processing unit 14 performs a secondary communication test between the primary transceiver 16 and each failed communication apparatus in the previous sub-scan period during a next sub-scan period. In detail, the step of performing the secondary communication test is described as follows: the processing unit 14 controls the primary transceiver 16 to transmit a request signal to each failed communication apparatus and ready to receive a response signal from each failed communication apparatus in response to the request signal.

Step 208, the processing unit 14 judges whether the secondary communication test has failed. If the secondary communication test has failed, the processing unit 14 determines the corresponding communication apparatus as the failed communication apparatus if the secondary communication test has failed, then the process goes to step 206. If the secondary communication test is successful, the process ends, and the full scan period is completed. In detail, the step of judging whether the secondary communication test has failed is described as follows: the processing unit 14 judges whether each ID code included in each response signal matches with each ID code of the failed communication apparatuses stored in the storage unit 12 to judge whether the primary transceiver 16 has successfully received the response signal from all the failed communication apparatuses. If it is determined that the primary transceiver 16 has successfully received the response signal from all the failed communication apparatuses, the secondary communication test is successful, and the full scan period is completed; otherwise the secondary communication test is failed.

In this embodiment, the step of performing the primary communication test or the secondary communication test further includes the following steps: the processing unit 14 controls the primary transceiver 16 to transmit the request signal every first predetermined time period. The processing unit 14 further judges whether the primary transceiver 16 has received the response signal during a second determined time period after the primary transceiver has transmitted the request signal. If it is determined that the primary transceiver 16 has not received the response signal during the second determined time period, the processing unit 14 controls the primary transceiver 16 to stop searching for the response signal.

Alternative embodiments will become apparent to those skilled in the art without departing from the spirit and scope of what is claimed. Accordingly, the present invention should be deemed not to be limited to the above detailed description, but rather only by the claims that follow and the equivalents thereof.

What is claimed is:

1. A base station apparatus for communicating with a plurality of communication apparatuses, the base station apparatus comprising:
 a primary transceiver; and
 a processing unit for controlling the primary transceiver to communicate with the related communication apparatuses during a full scan period;
 wherein the full scan period comprises at least one sub-scan period, during one sub-scan period, the processing unit performs a primary communication test between the primary transceiver and each of the related communication apparatuses, judges whether the primary communication test has failed, and determines the corresponding communication apparatus as a failed communication apparatus if the primary communication test has failed; the processing unit further performs a secondary communication test between the primary transceiver and each failed communication apparatus in the previous sub-scan period during a next sub-scan period.

2. The base station apparatus of claim 1, wherein the processing unit judges whether the secondary communication test has failed, determines the corresponding communication apparatus as the failed communication apparatus, and repeatedly performs the secondary communication test if the secondary communication test has failed.

3. The base station apparatus of claim 1, wherein if the primary communication test is successful, the full scan period is completed.

4. The base station apparatus of claim 1, wherein if the secondary communication test is successful, the full scan period is completed.

5. The base station apparatus of claim 1, wherein during a first sub-scan period, the processing unit performs the primary communication test between the primary transceiver and each of the plurality of communication apparatuses.

6. The base station apparatus of claim 5, further comprising a storage unit for storing a plurality of identification (ID) codes respectively assigned to the plurality of communication apparatuses, wherein the processing unit is used for controlling the primary transceiver to transmit a request signal to each of the plurality of communication apparatuses, and ready to receive a response signal from each of the plurality of communication apparatuses in response to the request signal; each response signal includes the ID code of corresponding communication apparatus; the processing unit judges whether each ID code included in each response signal matches with each ID code stored in the storage unit to judge whether the primary communication test has failed.

7. The base station apparatus of claim 6, wherein the processing unit controls the primary transceiver to transmit the request signal every first predetermined time period.

8. The base station apparatus of claim 7, wherein the processing unit further judges whether the primary transceiver has received the response signal during a second determined time period after the primary transceiver has transmitted the request signal; if it is determined that the primary transceiver has not received the response signal, the processing unit controls the primary transceiver to stop searching for the response signal.

9. The base station apparatus of claim 6, wherein each of the communication apparatuses includes a secondary transceiver, the processing unit receives the response signal from the secondary transceiver of each communication apparatus in response to the request signal.

10. A communication method for performing communication operations between a base station apparatus and a plurality of communication apparatuses, the base station apparatus comprises a primary transceiver, the method comprising:
controlling the primary transceiver to communicate with the related communication apparatuses during a full scan period, the full scan period comprises at least one sub-scan period;
performing a primary communication test between the primary transceiver and each of the related communication apparatuses during one sub-scan period;
judging whether the primary communication test has failed;
determining the corresponding communication apparatus as a failed communication apparatus if the primary communication test has failed; and
performing a secondary communication test between the primary transceiver and each failed communication apparatus in the previous sub-scan period during a next sub-scan period.

11. The communication method of claim 10, further comprising:
judging whether the secondary communication test has failed; and
determining the corresponding communication apparatus as the failed communication apparatus and repeatedly performing the secondary communication test if the secondary communication test has failed.

12. The communication method of claim 10, wherein if the primary communication test is successful, the full scan period is completed.

13. The communication method of claim 10, wherein if the secondary communication test is successful, the full scan period is completed.

14. The communication method of claim 10, comprising:
performing the primary communication test between the primary transceiver and each of the plurality of communication apparatuses during a first sub-scan period.

15. The communication method of claim 10, wherein the step of performing the primary communication test comprising:
providing a storage unit to store a plurality of identification (ID) codes respectively assigned to the related communication apparatuses; and
controlling the primary transceiver to transmit a request signal to each of the related communication apparatuses and ready to receive a response signal from each of the related communication apparatuses in response to the request signal; each response signal includes the ID code of corresponding communication apparatus.

16. The communication method of claim 15, wherein the step of judging whether the primary communication test has failed comprising:
judging whether each ID code included in each response signal matches with each ID code of the related communication apparatuses stored in the storage unit to judge whether the primary transceiver has successfully received the response signal from all the related communication apparatuses.

17. The communication method of claim 16, wherein the step of performing the secondary communication test comprising:
controlling the primary transceiver to transmit a request signal to each failed communication apparatus and ready to receive a response signal from each failed communication apparatus in response to the request signal.

18. The communication method of claim 17, wherein the step of judging whether the secondary communication test has failed comprising:
judging whether each ID code included in each response signal matches with each ID code of the failed communication apparatuses stored in the storage unit to judge whether the primary transceiver has successfully received the response signal from all the failed communication apparatuses.

19. The communication method of claim 17, wherein the step of performing the primary communication test or the secondary communication test further comprising:
controlling the primary transceiver to transmit the request signal every first predetermined time period;
judging whether the primary transceiver has received the response signal during a second determined time period after the primary transceiver has transmitted the request signal; and
controlling the primary transceiver to stop searching for the response signal if it is determined that the primary transceiver has not received the response signal during the second determined time period.

* * * * *